United States Patent
Kim et al.

(10) Patent No.: US 9,201,415 B2
(45) Date of Patent: Dec. 1, 2015

(54) INTERNAL CONTROL SIGNAL REGULATION CIRCUIT

(75) Inventors: Yong Ju Kim, Icheon-si (KR); Dae Han Kwon, Seoul (KR); Hae Rang Choi, Icheon-si (KR); Jae Min Jang, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 1007 days.

(21) Appl. No.: 13/341,682

(22) Filed: Dec. 30, 2011

(65) Prior Publication Data
US 2013/0041612 A1 Feb. 14, 2013

(30) Foreign Application Priority Data
Aug. 9, 2011 (KR) .......................... 10-2011-0078944

(51) Int. Cl.
*H03K 19/00* (2006.01)
*G05B 19/042* (2006.01)

(52) U.S. Cl.
CPC .... *G05B 19/042* (2013.01); *G05B 2219/23314* (2013.01); *G05B 2219/24036* (2013.01); *G05B 2219/24037* (2013.01)

(58) Field of Classification Search
CPC ..................... G05B 19/042; G01R 31/318516; G01R 31/07; H03K 2004/00091
See application file for complete search history.

(56) References Cited

U.S. PATENT DOCUMENTS

| | | | |
|---|---|---|---|
| 6,278,643 B1* | 8/2001 | Penney | G11C 29/816 365/189.07 |
| 6,553,525 B1* | 4/2003 | Shephard, III | G01R 31/318516 714/733 |
| 2009/0049348 A1* | 2/2009 | Iwai | G11C 29/08 714/718 |
| 2010/0134192 A1 | 6/2010 | Min et al. | |
| 2010/0199136 A1* | 8/2010 | Patra | G01R 31/31726 714/731 |
| 2011/0023741 A1* | 2/2011 | Choi | F42C 11/00 102/200 |
| 2011/0204951 A1* | 8/2011 | Kim | G11C 5/147 327/306 |

FOREIGN PATENT DOCUMENTS

| KR | 1020050014666 A | 2/2005 |
|---|---|---|
| KR | 1020100073907 A | 7/2010 |
| KR | 1020100125095 A | 11/2010 |

* cited by examiner

*Primary Examiner* — Jason M Crawford
(74) *Attorney, Agent, or Firm* — William Park & Associates Ltd.

(57) ABSTRACT

An internal control signal regulation circuit includes a programming test unit configured to detect an internal control signal in response to an external control signal and generate a selection signal, test codes and a programming enable signal; and a code processing unit configured to receive the test codes or programming codes in response to the selection signal and regulate the internal control signal.

30 Claims, 3 Drawing Sheets

INTERNAL CONTROL SIGNAL REGULATION CIRCUIT

CROSS-REFERENCES TO RELATED APPLICATIONS

The present application claims priority under 35 U.S.C 119(a) to Korean Application No. 10-2011-0078944, filed on Aug. 9, 2011, in the Korean Intellectual Property Office, which is incorporated herein by reference in its entirety set forth in full.

BACKGROUND

In general, an integrated circuit generates and uses an internal control signal so as to perform various internal operations. The internal control signal generated in the integrated circuit is regulated as to the current amount, the voltage level, the frequency and so forth thereof to control the internal operations.

While the current amount, the voltage level, the frequency and so forth of the internal control signal are regulated during the internal operations of the integrated circuit, they are also regulated through a test performed during a wafer process. For example, by performing a test capable of setting the frequency of an internal control signal to a target value during a wafer process, the refresh cycle of a semiconductor memory device which is mounted to an integrated circuit may be regulated.

In order to regulate the current amount, the voltage level, the frequency and so forth of an internal control signal, in a test mode which is established during a wafer process, a fuse programming scheme is mainly adopted such that a refresh cycle is measured and the connection states of fuses included in an integrated circuit are regulated. Fuse programming is performed in a physical way of changing the connection states of fuses from short states to open states using a laser beam.

Even though a test for regulating an internal control signal is performed during a wafer process, variations may occur in the current amount, the voltage level, the frequency and so forth of the internal control signal while annealing is performed during a packaging process. Accordingly, it is necessary to perform a test for regulating an internal control signal in the packaging process. However, lots of time and cost are required to measure and regulate the current amount, the voltage level, the frequency and so forth of the internal control signal which has undergone a variation, in every package.

SUMMARY

An embodiment of the present invention relates to an internal control signal regulation circuit which can automatically regulate an internal control signal instead of regulating the internal control signal by measuring the current amount, voltage level, frequency and so forth of the internal control signal when a change occurs in the internal control signal.

In one embodiment, an internal control signal regulation circuit includes: a programming test unit configured to detect an internal control signal in response to an external control signal and generate a selection signal, test codes and a programming enable signal; and a code processing unit configured to receive the test codes or programming codes in response to the selection signal and regulate the internal control signal.

In another embodiment, an internal control signal regulation circuit is configured to program fuses comprising electrically regulated connection states when an internal control signal and an external control signal are the same, and generate programming codes for regulating the internal control signal.

In another embodiment, an internal control signal regulation circuit includes: a programming test unit configured to generate a selection signal which is enabled and test codes which are counted when frequencies of an internal control signal and an external control signal are different from each other, and generate a programming enable signal which is enabled when the frequencies of the internal control signal and the external control signal are the same as each other; and a code processing unit configured to receive the test codes or programming codes in response to the selection signal and regulate the frequency of the internal control signal to regulate a refresh cycle of a semiconductor memory device.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
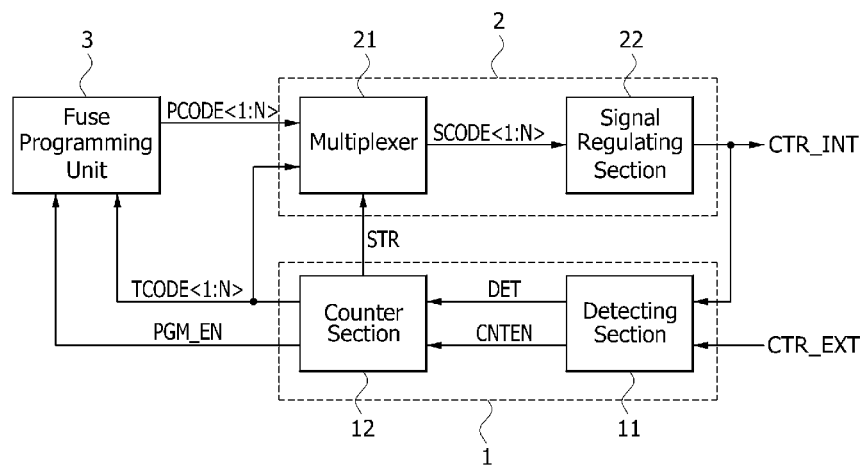
FIG. 1 is a block diagram showing a configuration of an internal control signal regulation circuit in accordance with an embodiment of the present invention.

FIG. 1 is a block diagram showing the configuration of an internal control signal regulation circuit in accordance with an embodiment of the present invention.

Referring to FIG. 1, an internal control signal regulation circuit in accordance with an embodiment of the present invention includes a programming test unit 1, a code processing unit 2, and a fuse programming unit 3. The programming test unit 1 includes a detecting section 11 and a counter section 12. The code processing unit 2 includes a multiplexer 21 and a signal regulating section 22.

The detecting section 11 is configured to detect whether an internal control signal CTR_INT and an external control signal CTR_EXT are the same as each other and generate a detection signal DET and a counting enable signal CNTEN. The detecting section 11 is configured to detect whether corresponding ones of the frequencies, the current amounts and the voltages of the internal control signal CTR_INT and the external control signal CTR_EXT are the same. In other words, the detecting section 11 may determine if a frequency of the internal control signal CTR_INT is the same as a frequency of the external control signal CTR_EXT, and if a current amount of the internal control signal CTR_INT is the same as a current amount of the external control signal CTR_EXT, and if a voltage of the internal control signal CTR_INT is the same as a voltage of the external control signal CTR_EXT. The counting enable signal CNTEN is controlled to be enabled to a logic high level such that the counter section 12 performs a counting operation according to a level of the detection signal DET. When the internal control signal CTR_INT and the external control signal CTR_EXT are different from each other, the detection signal DET controls the counter section 12 to up-count or down-count first to $N^{th}$ test codes TCODE<1:N>. Up-counting means an operation of increasing the first to $N^{th}$ test codes TCODE<1:N> one bit by one bit, and down-counting means an operation of decreasing the first to $N^{th}$ test codes TCODE<1:N> one bit by one bit.

In detail, if the internal control signal CTR_INT and the external control signal CTR_EXT are the same, the detecting section 11 generates the counting enable signal CNTEN disabled to a logic low level. If the internal control signal CTR_INT and the external control signal CTR_EXT are different from each other, the detecting section 11 generates the counting enable signal CNTEN enabled to the logic high level. Accordingly, when the internal control signal CTR_INT and the external control signal CTR_EXT are different from each other, the detecting section 11 generates the detection signal DET which controls the counter section 12 to up-count or down-count the first to $N^{th}$ test codes TCODE<1:N>.

The counter section 12 is configured to up-count or down-count the first to $N^{th}$ test codes TCODE<1:N> according to the level of the detection signal DET when the counting enable signal CNTEN enabled to the logic high level is inputted thereto. At this time, the counter section 12 generates a selection signal STR which is enabled to a logic high level and a programming enable signal PGM_EN which is disabled to a logic low level.

The counter section 12 interrupts the operation of counting the first to $N^{th}$ test codes TCODE<1:N> when the counting enable signal CNTEN disabled to the logic low level is inputted thereto. At this time, the counter section 12 generates the programming enable signal PGM_EN which is enabled to a logic high level and the selection signal STR which is disabled to a logic low level.

The multiplexer 21 is configured to transfer the first to $N^{th}$ test codes TCODE<1:N> or first to $N^{th}$ programming codes PCODE<1:N> as first to $N^{th}$ selection codes SCODE<1:N>. In detail, when the selection signal STR is enabled to the logic high level, the multiplexer 21 transfers the first to $N^{th}$ test codes TCODE<1:N> as the first to $N^{th}$ selection codes SCODE<1:N>, and when the selection signal STR is disabled to the logic low level, the multiplexer 21 transfers the first to $N^{th}$ programming codes PCODE<1:N> as the first to $N^{th}$ selection codes SCODE<1:N>.

The signal regulating section 22 is configured to regulate the internal control signal CTR_INT in response to the first to $N^{th}$ selection codes SCODE<1:N>. In detail, the signal regulating section 22 increases or decreases one of the frequency, the current amount or the voltage of the internal control signal CTR_INT according to a level combination of the first to $N^{th}$ selection codes SCODE<1:N>.

The fuse programming unit 3 includes a plurality of fuses to be programmed by the first to $N^{th}$ test codes TCODE<1:N> in the state in which the programming enable signal PGM_EN is enabled to the logic high level. The fuse programming unit 3 generates the first to $N^{th}$ programming codes PCODE<1:N> according to connection states of programmed fuses. Ways for programming the fuses included in the fuse programming unit 3 are divided into a physical way of using a laser and an electrical way of using electricity. Fuses which are programmed in the electrical way are referred to as e-fuses. E-fuses are divided into anti type fuses in which the connection states of fuses are changed from open states to short states, and blowing type fuses in which the connection states of fuses are changed from short states to open states. E-fuses are generally programmed in the state which a semiconductor memory device is packaged.

Operations of the internal control signal regulation circuit in accordance with an embodiment of the present invention, configured as mentioned above, will be described below on the assumption that the internal control signal CTR_INT and the external control signal CTR_EXT are different from each other.

First, because the internal control signal CTR_INT and the external control signal CTR_EXT are different from each other, the detecting section 11 generates the counting enable signal CNTEN which is enabled to the logic high level. The detection signal DET generated by the detecting section 11 is set to a first level when one of the frequency, the current amount or the voltage of the external control signal CTR_EXT is greater than a corresponding frequency, current amount or voltage of the internal control signal CTR_INT. The detection signal DET generated by the detecting section 11 may be set to a second level when one of the frequency, the current amount and the voltage of the external control signal CTR_EXT is less than a corresponding one of the internal control signal CTR_INT. The first and second levels are set to have different logic levels. For example, the first level may be set to a logic high level, and the second level may be set to a logic low level.

The counter section 12 up-counts or down-counts the first to $N^{th}$ test codes TCODE<1:N> in response to the detection signal DET in the state in which the counting enable signal CNTEN enabled to the logic high level is inputted thereto. The operation of the counter section 12 of up-counting or down-counting the first to $N^{th}$ test codes TCODE<1:N> according to the level of the detection signal DET may be set in a variety of ways according to embodiments. For example, if one of the frequency, the current amount and the voltage of the external control signal CTR_EXT is greater than corresponding one of the internal control signal CTR_INT, the counter section 12 may be configured to receive the detection signal DET with the first level and up-count the first to $N^{th}$ test codes TCODE<1:N>. By the first to $N^{th}$ test codes TCODE<1:N> up-counted by the counter section 12, one of the frequency, the current amount and the voltage of the internal control signal CTR_INT is regulated in such a way as to be increased.

Then, the multiplexer 21 transfers the first to $N^{th}$ test codes TCODE<1:N> or the first to $N^{th}$ programming codes PCODE<1:N> as the first to $N^{th}$ selection codes SCODE<1:N> in response to the selection signal STR. If the counting enable signal CNTEN enabled to the logic high level is inputted, since the selection signal STR generated by the counter section 12 has the logic high level, the multiplexer 21 transfers the first to $N^{th}$ test codes TCODE<1:N> as the first to $N^{th}$ selection codes SCODE<1:N>.

The signal regulating section 22 regulates the internal control signal CTR_INT in response to the first to $N^{th}$ selection codes SCODE<1:N>. The regulating operation of the signal regulating section 22 is maintained until the internal control signal CTR_INT and the external control signal CTR_EXT become the same as each other. This is because the first to $N^{th}$ test codes TCODE<1:N> counted by the counter section 12 are transferred as the first to $N^{th}$ selection codes SCODE<1:N> when the internal control signal CTR_INT and the external control signal CTR_EXT are different from each other.

When the internal control signal CTR_INT and the external control signal CTR_EXT become the same as each other, the detecting section 11 disables the counting enable signal CNTEN to the logic low level and interrupts the counting operation of the counter section 12. At this time, the counter section 12 generates the programming enable signal PGM_EN which is enabled to the logic high level and the selection signal STR which is disabled to the logic low level.

The fuse programming unit 3 receives the first to $N^{th}$ test codes TCODE<1:N> in the state in which the programming enable signal PGM_EN enabled to the logic high level, programs the fuses included therein, and generates the first to $N^{th}$ programming codes PCODE<1:N>. The first to $N^{th}$ programming codes PCODE<1:N> are generated in the same manner as the first to $N^{th}$ test codes TCODE<1:N> with the counting interrupted.

The multiplexer 21 receives the selection signal STR with the logic low level and transfers the first to $N^{th}$ programming codes PCODE<1:N> as the first to $N^{th}$ selection codes SCODE<1:N>.

Finally, the signal regulating section 22 regulates the internal control signal CTR_INT in response to the first to $N^{th}$ selection codes SCODE<1:N>. Since the first to $N^{th}$ programming codes PCODE<1:N> generated in the same manner as the first to $N^{th}$ test codes TCODE<1:N> with the counting interrupted are transferred as the first to $N^{th}$ selection codes SCODE<1:N>, the internal control signal CTR_INT is maintained to be the same as the external control signal CTR_EXT.

As described above, the internal control signal regulation circuit in accordance with an embodiment of present invention automatically regulates the internal control signal CTR_INT through counting the first to $N^{th}$ test codes TCODE<1:N> so that the internal control signal CTR_INT becomes the same as the external control signal CTR_EXT. Also, after the internal control signal CTR_INT becomes the same as the external control signal CTR_EXT, the internal control signal regulation circuit programs the fuses included in the fuse programming unit 3 by using the first to $N^{th}$ test codes TCODE<1:N> of which counting is interrupted, and maintains the internal control signal CTR_INT and the external control signal CTR_EXT to be the same as each other.

Hereafter, configurations and operations of the detecting section 11 and the signal regulating section 22 included in the internal control signal regulation circuit will be described in detail with reference to FIGS. 2 and 3. Embodiments of the detecting section 11 and the signal regulating section 22 shown in FIGS. 2 and 3 may be used regulating the frequency of an internal control signal to determine a refresh cycle of a semiconductor memory device.

Figure 2:
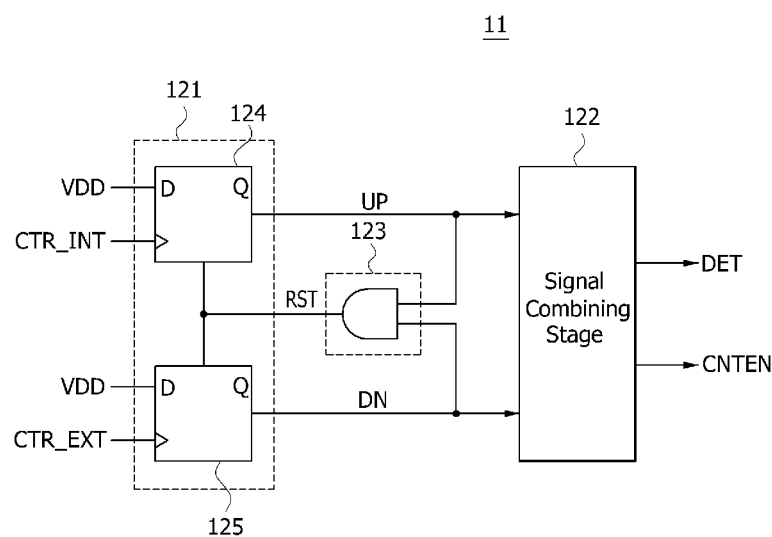
FIG. 2 is a diagram showing a detecting section included in the internal control signal regulation circuit shown in FIG. 1.

Referring to FIG. 2, the detecting section 11 includes a latch stage 121, a signal combining stage 122, and a reset signal generation stage 123. The latch stage 121 includes a first latch 124 which latches a power supply voltage VDD in synchronization with the rising edge of the internal control signal CTR_INT and outputs an up signal UP. The latch stage 121 may further comprise a second latch 125 which latches the power supply voltage VDD in synchronization with the rising edge of the external control signal CTR_EXT and outputs a down signal DN. The signal combining stage 122 enables the counting enable signal CNTEN to the logic high level when the levels of the up signal UP and the down signal DN are different from each other. Also, the signal combining stage 122 generates the detection signal DET with the logic high level when only the up signal UP has a logic high level, and generates the detection signal DET with the logic low level when only the down signal DN has a logic high level. The reset signal generation stage 123 generates a reset signal RST with a logic high level when both the up signal UP and the down signal DN have the logic high levels. The latch stage 121 resets both the up signal UP and the down signal DN to logic low levels when the reset signal RST with the logic high level is inputted thereto. The counting enable signal CNTEN may be set to have the logic high level during a period in which the frequencies of the internal control signal CTR_INT and the external control signal CTR_EXT are different from each other.

The detecting section 11 configured in this way generates the counting enable signal CNTEN which is enabled to the logic high level when the frequencies of the internal control signal CTR_INT and the external control signal CTR_EXT are different from each other. Further, the detecting section 11 generates the detection signal DET with the logic high level when the frequency of the internal control signal CTR_INT is greater than that of the external control signal CTR_EXT, and the detecting section 11 generates the detection signal DET with the logic low level when the frequency of the internal control signal CTR_INT is less than that of the external control signal CTR_EXT. If the frequencies of the internal control signal CTR_INT and the external control signal CTR_EXT are the same, the detecting section 11 disables the counting control signal CNT_CONT to the logic low level and interrupts the counting operation of the counter section 12.

Figure 3:
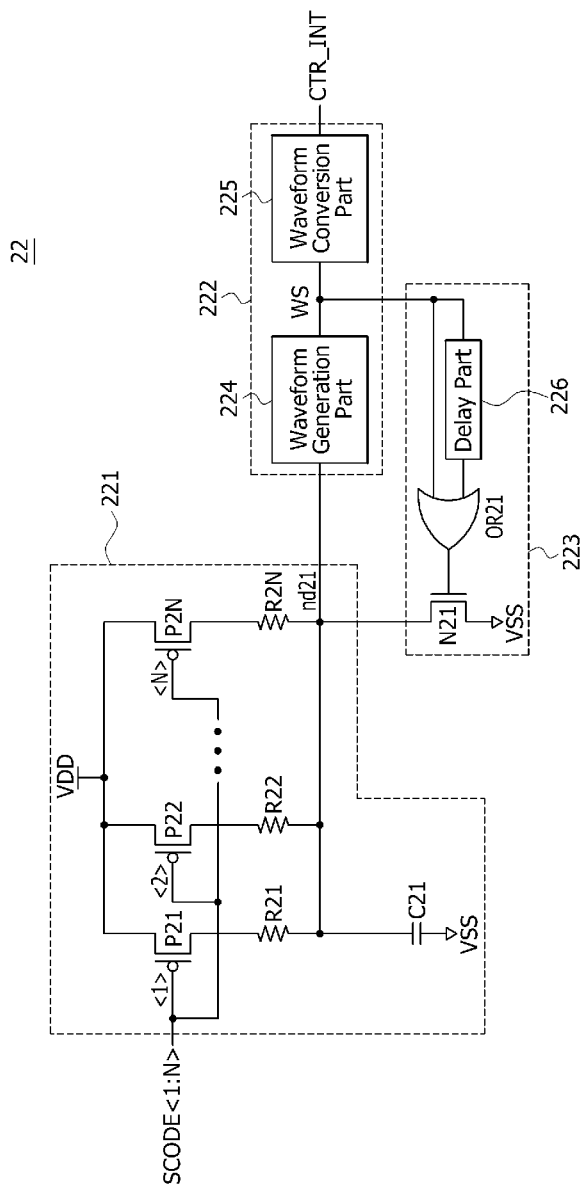
FIG. 3 is a diagram showing a signal regulating section included in the internal control signal regulation circuit shown in FIG. 1.

Referring to FIG. 3, the signal regulating section 22 includes a driving regulation stage 221, a signal processing stage 222, and a pull-down stage 223. The driving regulation stage 221 includes PMOS transistors P21 to P2N, resistors R21 to R2N and a capacitor C21. An RC delay value of the driving regulation stage 221 may be regulated by the PMOS transistors P21 to P2N which are selectively turned on in response to the first to $N^{th}$ selection codes SCODE<1:N>. The driving regulation stage 221 may also regulate a driving force for pull-up driving a node nd21. The signal processing stage 222 includes a waveform generation part 224 which receives the signal of the node nd21 and generates a sawtooth wave WS. The signal processing stage 222 may also include a waveform conversion part 225 which converts the waveform of the sawtooth wave WS into a square wave and generates the internal control signal CTR_INT. The signal processing stage 222 regulates the frequency of the internal control signal CTR_INT depending upon a speed at which the node nd21 is pull-up driven. The pull-down stage 223 includes a delay part 226, an OR gate OR21 and an NMOS transistor N21. The pull-down stage 223 pull-down drives the node nd21 when the level of the sawtooth wave WS is raised to a logic high level. The pull-down stage 223 interrupts the pull-down driving of the node nd21 after the delay period of the delay part 226 is lapsed when the level of the sawtooth wave WS transitions to a logic low level.

The signal regulating section 22 configured in this way regulates the RC delay value of the driving regulation stage 221 by the first to $N^{th}$ selection codes SCODE<1:N> and regulates the speed at which the node nd21 is pull-up driven, so as to regulate the frequency of the internal control signal CTR_INT. For example, if the frequency of the internal control signal CTR_INT is less than that of the external control signal CTR_EXT, the signal regulating section 22 generates the first to $N^{th}$ selection codes SCODE<1:N> for decreasing the RC delay value and thereby increases the frequency of the internal control signal CTR_INT.

The internal control signal regulation circuit, which is applied with the detecting section 11 and the signal regulating section 22 configured as mentioned above, can automatically regulate the frequency of the internal control signal CTR_INT by counting the first to $N^{th}$ test codes TCODE<1: N>, such that the frequencies of the internal control signal CTR_INT and the external control signal CTR_EXT become the same as each other. Hence, by regulating the frequency of the internal control signal CTR_INT, the internal control signal regulation circuit in accordance with an embodiment of the present invention can regulate the refresh cycle of a semiconductor memory device to the frequency of the external control signal CTR_EXT.

Figure 4:
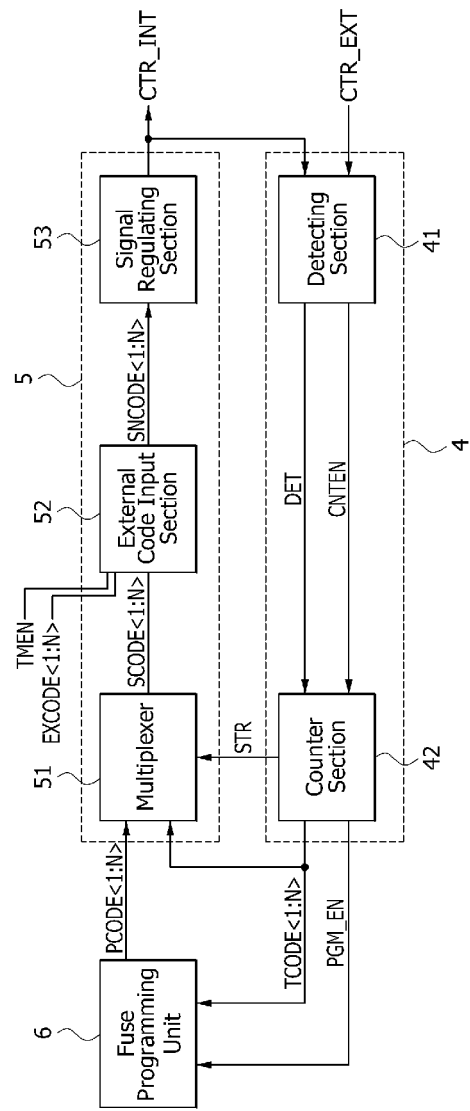
FIG. 4 is a block diagram showing a configuration of an internal control signal regulation circuit in accordance with another embodiment of the present invention.

FIG. 4 is a block diagram showing a configuration of an internal control signal regulation circuit in accordance with another embodiment of the present invention.

Referring to FIG. 4, an internal control signal regulation circuit in accordance with another embodiment of the present invention includes a programming test unit 4, a code processing unit 5, and a fuse programming unit 6. The programming test unit 4 includes a detecting section 41 and a counter section 42. The code processing unit 5 includes a multiplexer 51, an external code input section 52, and a signal regulating section 53.

The internal control signal regulation circuit in accordance with the present embodiment is distinguished from the internal control signal regulation circuit shown in FIG. 1 by the addition of the external code input section 52. Hereinbelow, the configuration and operation of the external code input section 52 will be described in detail.

The external code input section 52 is configured to selectively transfer first to $N^{th}$ selection codes SCODE<1:N> or first to $N^{th}$ external input codes EXCODE<1:N> inputted from outside the internal control signal regulation circuit, as first to $N^{th}$ input selection codes SNCODE<1:N> in response to a test mode enable signal TMEN. The first to $N^{th}$ input selection codes SNCODE<1:N> are used to regulate an internal control signal CTR_INT in the signal regulating section 53.

The internal control signal regulation circuit in accordance with the present embodiment, configured as mentioned above, has the external code input section 52 and provides a test mode capable of regulating the internal control signal CTR_INT not only by first to $N^{th}$ test codes TCODE<1:N> and first to $N^{th}$ programming codes PCODE<1:N>, but also by the external input codes EXCODE<1:N> inputted from the outside. Accordingly, the internal control signal regulation circuit in accordance with the present embodiment can easily regulate the internal control signal CTR_INT by using the external input codes EXCODE<1:N>.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An internal control signal regulation circuit comprising:
   a programming test unit configured to detect an internal control signal in response to an external control signal and generate a selection signal, test codes and a programming enable signal; and
   a code processing unit configured to receive the test codes or programming codes in response to the selection signal and regulate the internal control signal.

2. The internal control signal regulation circuit according to claim 1, wherein the programming test unit enables the selection signal and counts the test codes when the internal control signal and the external control signal are different from each other.

3. The internal control signal regulation circuit according to claim 1, wherein the programming test unit enables the programming enable signal when the internal control signal and the external control signal are the same as each other.

4. The internal control signal regulation circuit according to claim 1, wherein the programming test unit comprises:
   a detecting section configured to detect whether or not the internal control signal and the external control signal are the same as each other and generate a detection signal and a counting enable signal; and
   a counter section configured to count the test codes in response to the detection signal and the counting enable signal and generates the programming enable signal.

5. The internal control signal regulation circuit according to claim 4, wherein the detecting section enables the counting enable signal when the internal control signal and the external control signal are different from each other.

6. The internal control signal regulation circuit according to claim 5, wherein the counter section enables the selection signal when the counting enable signal is enabled, and counts the test codes in response to the detection signal.

7. The internal control signal regulation circuit according to claim 1, wherein the code processing unit comprises:
   a multiplexer configured to transfer the test codes or the programming codes as selection codes in response to the selection signal; and
   a signal regulating section configured to regulate the internal control signal in response to the selection codes.

8. The internal control signal regulation circuit according to claim 7, wherein the multiplexer transfers the test codes as the selection codes when the selection signal is enabled.

9. The internal control signal regulation circuit according to claim 1, wherein the code processing unit comprises:
   a multiplexer configured to transfer the test codes or the programming codes as selection codes in response to the selection signal;
   an external code input section configured to transfer external input codes or the selection codes as input selection codes in response to a test mode enable signal; and
   a signal regulating section configured to regulate the internal control signal in response to the input selection codes.

10. The internal control signal regulation circuit according to claim 1, further comprising:
    a fuse programming unit configured to program fuses in response to the programming enable signal and generate the programming codes.

11. The internal control signal regulation circuit according to claim 10, wherein connection states of the fuses are regulated in an electrical way.

12. An internal control signal regulation circuit that is configured to program fuses comprising electrically regulated connection states if an internal control signal and an external control signal are the same, and generate programming codes for regulating the internal control signal.

13. The internal control signal regulation circuit according to claim 12 further comprising a programming test unit configured to enable a selection signal and count test codes when the internal control signal and the external control signal are different from each other.

14. The internal control signal regulation circuit according to claim 13, wherein the programming test unit comprises:
    a detecting section configured to detect whether the internal control signal and the external control signal are the same and accordingly generate a detection signal and a counting enable signal; and
    a counter section configured to count the test codes in response to the detection signal and the counting enable signal and generate a programming enable signal, where the programming enable signal is enabled when the internal control signal and the external control signal are the same.

15. The internal control signal regulation circuit according to claim 14, wherein the detecting section enables the counting enable signal if the internal control signal and the external control signal are different from each other.

16. The internal control signal regulation circuit according to claim 14, wherein the counter section enables the selection signal if the counting enable signal is enabled, and counts the test codes in response to the detection signal.

17. The internal control signal regulation circuit according to claim 12, further comprising:
a code processing unit configured to receive test codes or the programming codes in response to a selection signal and regulate the internal control signal.

18. The internal control signal regulation circuit according to claim 17, wherein the code processing unit comprises:
a multiplexer configured to transfer the test codes or the programming codes as selection codes in response to the selection signal; and
a signal regulating section configured to regulate the internal control signal in response to the selection codes.

19. The internal control signal regulation circuit according to claim 18, wherein the multiplexer transfers the test codes as the selection codes when the selection signal is enabled.

20. The internal control signal regulation circuit according to claim 17, wherein the code processing unit comprises:
a multiplexer configured to transfer the test codes or the programming codes as selection codes in response to the selection signal;
an external code input section configured to transfer external input codes or the selection codes as input selection codes in response to a test mode enable signal; and
a signal regulating section configured to regulate the internal control signal in response to the input selection codes.

21. An internal control signal regulation circuit comprising:
a programming test unit configured to generate a selection signal which is enabled and test codes which are counted when frequencies of an internal control signal and an external control signal are different from each other, and generate a programming enable signal which is enabled when the frequencies of the internal control signal and the external control signal are the same as each other; and
a code processing unit configured to receive the test codes or programming codes in response to the selection signal and regulate the frequency of the internal control signal to regulate a refresh cycle of a semiconductor memory device.

22. The internal control signal regulation circuit according to claim 21, wherein the programming test unit comprises:

a detecting section configured to detect whether or not the internal control signal and the external control signal are the same as each other and generate a detection signal and a counting enable signal; and
a counter section configured to count the test codes in response to the detection signal and the counting enable signal and generate the programming enable signal.

23. The internal control signal regulation circuit according to claim 22, wherein the detecting section comprises:
a latch stage configured to latch a power supply voltage in synchronization with the internal control signal and the external control signal and output an up signal and a down signal; and
a signal combining stage configured to combine the up signal and the down signal and generate the detection signal and the counting enable signal.

24. The internal control signal regulation circuit according to claim 23, wherein the signal combining stage generates the counting enable signal which is enabled when levels of the up signal and the down signal are different from each other.

25. The internal control signal regulation circuit according to claim 23, wherein the signal combining stage generates the detection signal which has a first level when the up signal has the same level as the power supply voltage and a second level when the down signal has the same level as the power supply voltage.

26. The internal control signal regulation circuit according to claim 25, wherein the counter section up-counts the test codes when the detection signal has the first level and down-counts the test codes when the detection signal has the second level.

27. The internal control signal regulation circuit according to claim 21, wherein the code processing unit comprises:
a multiplexer configured to transfer the test codes or the programming codes as selection codes in response to the selection signal; and
a signal regulating section configured to regulate the internal control signal in response to the selection codes.

28. The internal control signal regulation circuit according to claim 27, wherein the signal regulating section comprises:
a driving regulation stage configured to regulate driving of a node in response to the selection codes; and
a signal processing stage configured to regulate the frequency of the internal control signal depending upon a speed at which a level of the node is raised.

29. The internal control signal regulation circuit according to claim 21, further comprising:
a fuse programming unit configured to program fuses in response to the programming enable signal and generate the programming codes.

30. The internal control signal regulation circuit according to claim 29, wherein connection states of the fuses are regulated in an electrical way.

* * * * *